No. 648,033. Patented Apr. 24, 1900.
T. KIRSHMAN & L. M. MEDLIN.
BALING MACHINE.
(Application filed Sept. 28, 1897. Renewed Sept. 21, 1899.)

(No Model.) 6 Sheets—Sheet 1.

No. 648,033. Patented Apr. 24, 1900.
T. KIRSHMAN & L. M. MEDLIN.
BALING MACHINE.
(Application filed Sept. 28, 1897. Renewed Sept. 21, 1899.)

(No Model.) 6 Sheets—Sheet 2.

No. 648,033. Patented Apr. 24, 1900.
T. KIRSHMAN & L. M. MEDLIN.
BALING MACHINE.
(Application filed Sept. 28, 1897. Renewed Sept. 21, 1899.)
(No Model.) 6 Sheets—Sheet 4.

No. 648,033. Patented Apr. 24, 1900.
T. KIRSHMAN & L. M. MEDLIN.
BALING MACHINE.
(Application filed Sept. 28, 1897. Renewed Sept. 21, 1899.)

(No Model.) 6 Sheets—Sheet 5.

UNITED STATES PATENT OFFICE.

THOMAS KIRSHMAN, OF CALIFORNIA, AND LOGAN M. MEDLIN, OF LATHAM, MISSOURI.

BALING-MACHINE.

SPECIFICATION forming part of Letters Patent No. 648,033, dated April 24, 1900.

Application filed September 28, 1897. Renewed September 21, 1899. Serial No. 731,231. (No model.)

*To all whom it may concern:*

Be it known that we, THOMAS KIRSHMAN, of the city of California, and LOGAN M. MEDLIN, of the city of Latham, in the county of Moniteau and State of Missouri, have invented certain new and useful Improvements in Baling-Machines, of which the following is a full, clear, and exact description, reference being had to the accompanying drawings, forming a part hereof.

Our invention relates to baling-machines; and it consists of the novel construction, combination, and arrangement of parts hereinafter shown, described, and claimed.

Our object is to construct a baling-machine which may be attached to a threshing-machine and which will bale the straw that comes from the separator.

Referring by numerals to the drawings, the timbers 25 and 26 project backwardly from the threshing-machine in horizontal alinement with each other and from opposite sides of the separator, and the timbers 27 and 28 project backwardly from the separator in horizontal alinement with each other and in vertical alinement with said timbers 25 and 26, respectively. The extreme rear ends of the timbers 25 and 27 are connected by means of the timber 29, and the timber 30 connects the rear ends of the timbers 26 and 28 in transverse alinement with the timber 29. The timbers 25 and 26 are connected by means of the timber 31, and the timbers 27 and 28 are connected by means of the timber 32. This framework just described is built on the discharge end of a threshing-machine and serves as a base or framework on which the baling-machine is suspended and operates. The side board 33 is placed against the inner faces of the timbers 25 and 27 and inside of the timber 29. The side board 34 is placed against the inner faces of the timbers 26 and 28 and inside of the timber 30 in transverse alinement with the side board 33. The bearing-block 35 is attached to the rear edge of the side board 34 at approximately its center, and a similar bearing-block 36 (shown in dotted lines in Fig. 3) is attached to the rear edge of the side board 33 in horizontal alinement with the block 35. The feed-rollers 37 and 38 are placed in parallel position between the bearing-blocks 35 and 36 and with their spindles operating in the bearings carried by said bearing-blocks. The feed-rollers are mounted one above the other in a horizontal line transversely of the separator.

Figures 5, 6, 7, 8:
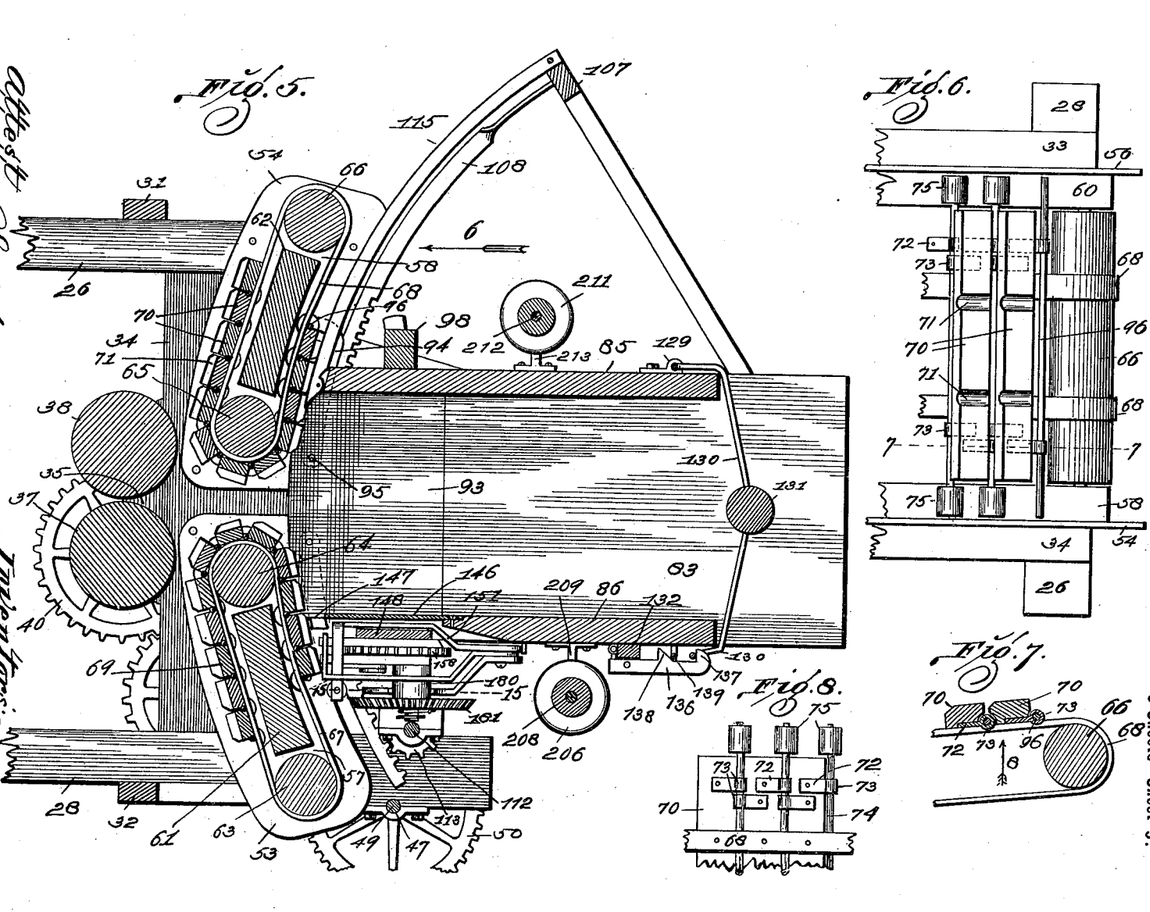
Fig. 5 is a vertical section taken approximately on the lines 5 5 of Figs. 1 and 2.
Fig. 6 is an enlarged detail of the part seen looking in the direction indicated by the arrow 6 in Fig. 5.
Fig. 7 is a vertical section taken approximately on the lines 7 7 of Fig. 6.
Fig. 8 is a bottom plan view of the part seen looking in the direction indicated by the arrow 8 in Fig. 7.

The straw-carrying apron 39 of the separator discharges the straw in such a way that it will pass between the rollers 37 and 38. In other words, the apron 39 delivers the straw to the feed-rollers. The spur-gear 40 is fixed upon the outer end of the spindle of the roller 37. A stub-shaft 41 projects outwardly from the timber 34, and a spur-gear 42 is mounted upon said stub-shaft in mesh with the gear 40. A stub-shaft 43 projects outwardly from the timber 28. A spur-gear 44 is mounted upon said stub-shaft in mesh with the gear 42, and a belt-wheel 45 is mounted upon said shaft and attached to the gear 44. The belt 46 connects the belt-wheel 45 with the source of motive power, which ordinarily will be a driven shaft of the separator. A bearing 47 is attached to the lower side of the timber 28 near its extreme rear end, and a similar bearing 48 is attached to the lower side of the timber 27 in transverse and horizontal alinement with the bearing 47. A shaft 49 is mounted in the bearings 47 and 48. A spur-gear 50 is fixed upon one end of the shaft 49, in mesh with the gear 44. A crank-arm 51 is fixed upon the shaft 49 outside of the gear 50, and a similar crank-arm 52 is fixed upon the opposite end of the shaft 49 outside of the frame. The end plates 53 and 54 are attached to the inner face of the side board 34, and similar plates 55 and 56 are attached to the inner face of the side board 33 in alinement, respectively, with said plates 53 and 54. A bearing-block 57 is attached to the inner face of the plate 53. A similar bearing-block 58 is attached to the inner face of the plate 54, and similar bearing-blocks 59 and 60 are attached to the inner faces of the plates 55 and 56 in transverse alinement with the bearing-blocks 57 and 58, respectively. The bearing-blocks 57 and 59 are connected by the cross-piece 61, and the bearing-blocks 58 and 60 are connected by the cross-piece 62. The rollers 63 and 64 are mounted in parallel positions upon opposite sides of the cross-piece 61 with their spindles operating in the bearings in the bearing-blocks 57 and 59. The rollers 65 and 66 are mounted in parallel positions upon opposite sides of the cross-piece 62 and between the bearing-blocks 58 and 60 and with their spindles operating in the bearings in said bearing-blocks. Relative to a vertical line the rollers 63, 64, 65, and 66 describe a segment of a circle, as shown in section in Fig. 5. The belts 67 are placed around the rollers 63 and 64 in parallel positions, and similar belts 68 are placed around the rollers 65 and 66 in parallel positions. A series of slats 69 are attached to the belts 67 transversely of the belts, said slats being substantially as long as the rollers 63 and 64 and said slats covering substantially one-half the length of the belts. It is only necessary to cover one-half of the length of the belts with the slats for the reason that said belts have a reciprocatory and not a rotary movement, and the number of slats necessary to cover one-half of the belts is sufficient to close the mouth of the baling-box (yet to be described) during the movements of said box. A similar series of slats 70 is attached to the belts 68. The belts 67 and the slats 69 form one reciprocating apron or carrier, and the belts 68 and the slats 70 form another reciprocating apron or carrier, and said reciprocating aprons or carriers are constructed as shown in detail in Figs. 6, 7, and 8. Grooves 71 are formed in transverse alinement in the faces of the slats 69 and 70. Metallic straps 72 are attached to the inner faces of the slats and project in transverse lines beyond the side edges of the slats, and bearings 73 are formed in lines longitudinally of the slats through the portions of said straps which project beyond the edges of the slats. When the slats are placed together side by side, the bearings 73 of the straps 72 lie side by side and in transverse alinement with each other, as shown in Fig. 8, and the shafts 74 are inserted through the bearings 73, thus forming hinge connections between the slats. The shafts 74 are somewhat longer than the slats 69 and 70, and the rollers 75 are mounted upon the ends of the shafts 74 and engage the edges of the bearing-blocks 57, 58, 59, and 60.

Upon the opposite ends of the spindles of the rollers 37 and 38 from the gear 40 are spur-gears 76 and 77, which mesh together and cause the rollers to rotate in opposite directions when the gear 40 is driven. The passage between the reciprocating aprons or carriers is in a horizontal line with the passage between the rollers 37 and 38.

The arms 78 are attached to the timber 29 and extend backwardly, and a bearing 79 is formed in their meeting rear ends, said bearing being in horizontal alinement with the passage between the rollers 37 and 38. Similar arms 80 are attached to the timber 30, and a bearing 81 is formed in their meeting rear ends, said bearing 81 being in horizontal and transverse alinement with the bearing 79.

The baling-box 82 is mounted between the arms 78 and 80, and said baling-box consists of the side pieces 83 and 84, mounted in horizontal alinement, the top piece 85 connecting the upper edges of the side pieces 83 and 84 and the bottom piece 86 connecting the lower edges of said side pieces. The top piece 85 and the bottom piece 86 are somewhat shorter than the side pieces 83 and 84. The blocks 87 and 88 are attached to the extreme rear ends and outer faces of the side pieces 83 and 84, and the pins 89 and 90 are inserted through the bearings 79 and 81, respectively, into the blocks 87 and 88, thus forming pivotal connections between the baling-box 82 and the arms 78 and 80. The forward end of the box 82 operates near to the reciprocating aprons and is in the form of a segment, corresponding to the segment described by the rollers 63, 64, 65, and 66, as required to allow the forward end of the box to be oscillated up and down adjacent to said reciprocating aprons, and the forward edges of the side pieces of the box operate adjacent to the rollers 75. The inner faces of the side pieces of the baling-box have recesses 91 and 92, said recesses being covered by the sheet-metal plates 93. The connecting-rod 94 is placed in the recess 92 and pivotally connected to the box by means of the pin 95 at one of its ends, and the shaft 96 is inserted through the last pair of the bearings 73 into a bearing in the opposite end of said connecting-rod from the pin 95, thus forming a connection between the forward end of the baling-box and the upper reciprocating apron. A connecting-rod 97 is mounted in the recess 91 and connects with the opposite end of the shaft 96 from the connecting-rod 94. A connection is formed between the baling-box and the lower reciprocating apron in the same manner as that described with reference to the connecting-rods 94 and 95. A timber 98 is attached to the top piece 85 in a transverse line and extends beyond the edges of said top piece, and pins 99 and 100 project from the ends of said timber. A connecting-rod 101 connects the crank-pin 102, carried by the crank-arm 51, with the pin 100, and a similar connecting-rod 103 connects the crank-pin 104, carried by the crank-arm 52, with the pin 99, as required to reciprocate the forward end of the baling-box up and down by the rotation of the shaft 49. Connecting-rods 105 and 106 are mounted inside of the arms 78 and 80, with the pins 89 and 90 extending through their ends, and said connecting-rods extend from said pins upwardly and forwardly and have their free ends connected by the bar 107. The segmental racks 108 and 109 are attached at their upper ends to the bar 107, and said racks extend upon opposite sides of the baling-box to points below the lower side of the baling-box. Bearing-blocks 110 and 111 are attached to the lower edges and rear ends of the side pieces 83 and 84, and a shaft 112 is mounted in said bearing-blocks transversely of the baling-box. A spur-gear 113 is fixed upon one end of the shaft 112 and meshes with the rack 108, and a similar spur-gear 114 is fixed upon the opposite end of said shaft and meshes with the rack 109.

Figures 3, 9, 10, 11, 23:
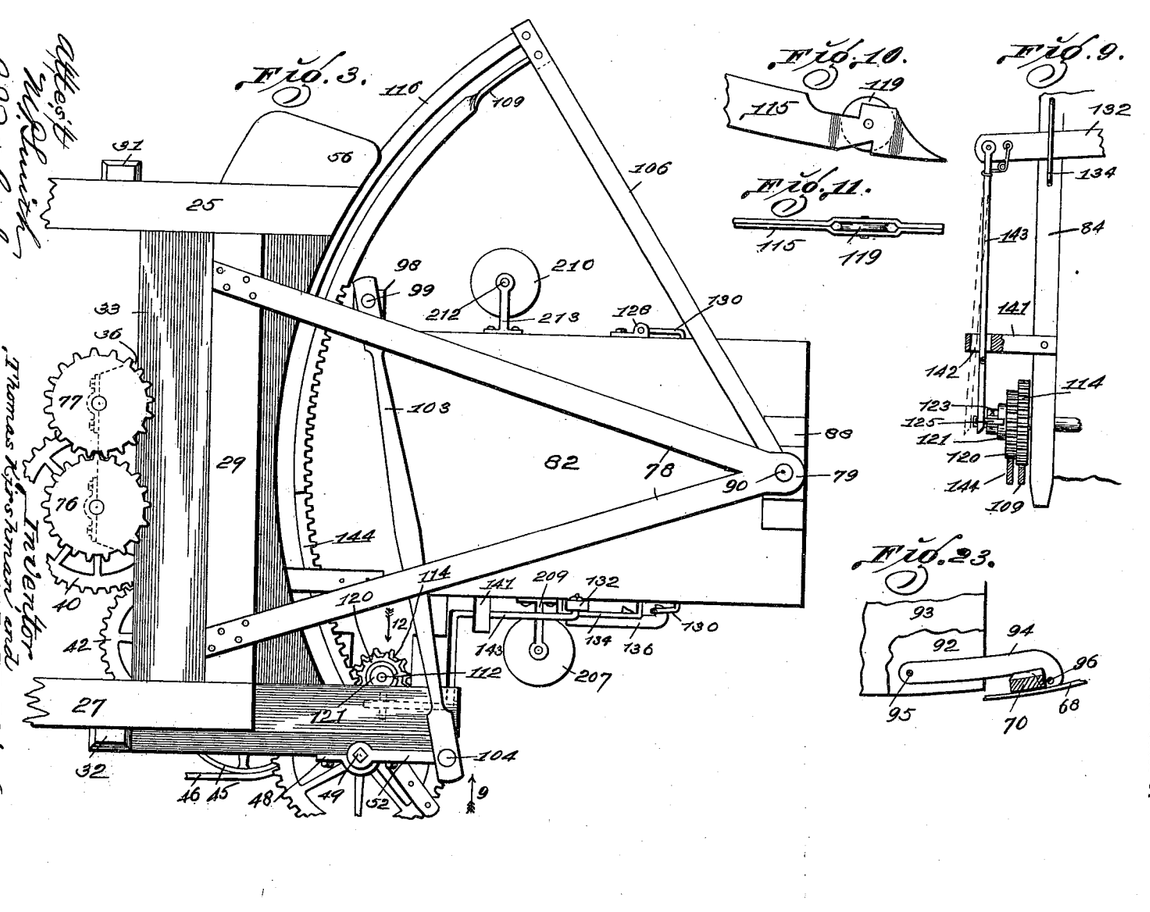
Fig. 3 is a side elevation taken looking in the direction indicated by the arrows 3 in Figs. 1 and 2.
Fig. 9 is a view in elevation of the part seen looking in the direction indicated by the arrow 9 in Fig. 3.
Fig. 10 is an enlarged detail view in elevation of the point of one of the baling-needles.
Fig. 11 is a top plan view of the part shown in Fig. 10.
Fig. 23 is a detail view in elevation, showing the connection between the baling-box and one of the reciprocating aprons.

The baling-needles 115 and 116 have their upper ends rigidly secured to the bar 107 between and at points equidistant from the racks 108 and 109, and said needles are in direct alinement with the recesses 71 in the slats of the reciprocating aprons, and when the needles are at rest the points of the needles extend into the slots 117 and 118, respectively, formed in the rear edges of the top pieces 85. The needles are segments of substantially the same circle as that described by the racks, and said needles are rectangular in cross-section, their longest cross-section measurement being in a line extending longitudinally of the baling-box. The points of the needles are bifurcated or slotted to receive the grooved rollers 119, as shown in Figs. 10 and 11. When the gears 113 and 114 are operated to throw the racks 108 and 109 downwardly, the needles pass entirely through the rear end of the baling-box, and when the operation of the gears is reversed the needles are withdrawn from the baling-box.

The spur gear 120 is loosely mounted upon the shaft 112 outside of the gear 114, and the wheel 121 is fixed to or formed integral with the outer face of the gear 120, the periphery of said wheel 121 being concentric to the shaft 112 and having a single notch 122 formed in a line extending longitudinally of the shaft. A collar 123 is fixed upon the end of the shaft outside of the wheel 121. Ears 124 project from said collar, and the latch 125 is pivotally mounted between said ears, with its inner end in position to engage in the slot 122. A leaf-spring 126 is fixed to the collar between the ears 124, as required to operate the latch 125 and cause its free end to engage in said slot 122. The corner 127 of the outer end of the latch 125 is beveled. The ears 128 and 129 are attached to the upper edges of the side pieces of the baling-box. A wire 130 has one of its ends inserted into the ear 128, and said wire is bent into a longitudinal line and extends inside of the side piece 84 downwardly past the rear ends of the top and bottom pieces 85 and 86, then along the outer face of the bottom piece 86 to the inner face of the side piece 83, and then upwardly to the ear 129. A roller 131 is placed in position with its spindles operating in bearings formed in the wire 130, as required to bring the roller 131 in a position transversely of the rear end of the baling-box half-way between the rear ends of the top and bottom pieces 85 and 86, as shown in Fig. 5, and thus form a gate against which the bale of straw will press when the baling-box is full.

Figure 1:
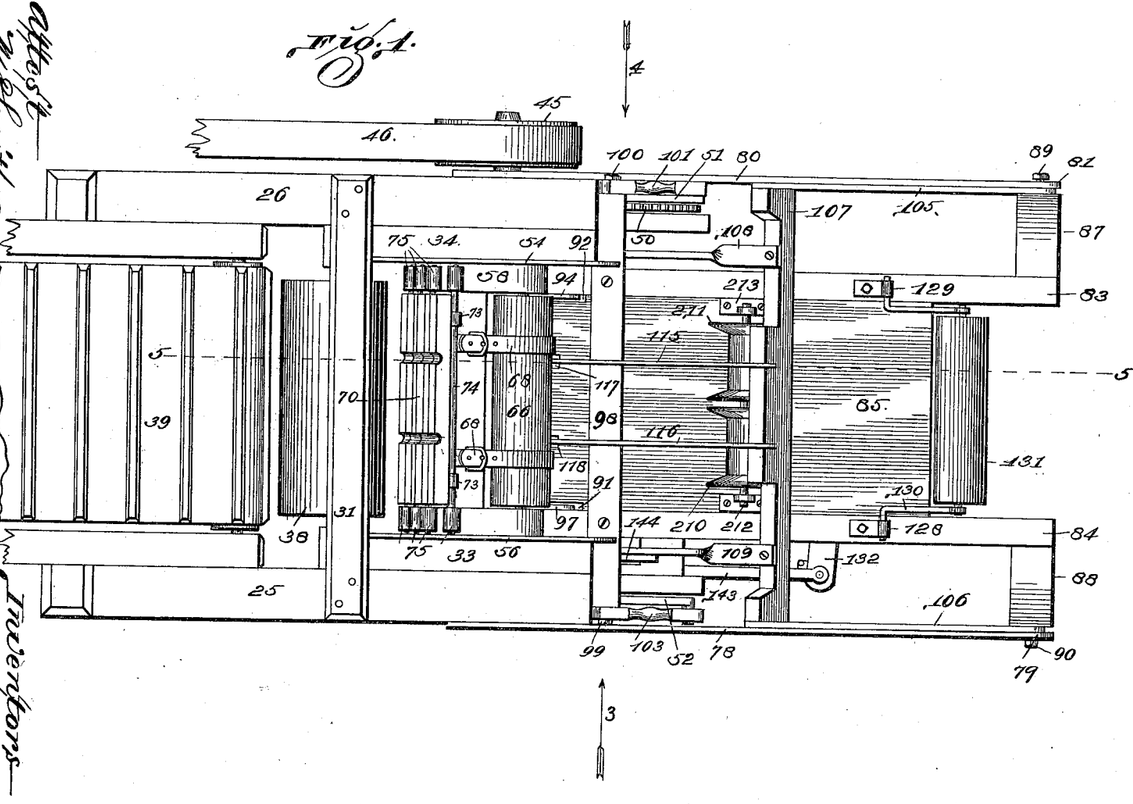
Figure 1 is a top plan view of our improved baling-machine in position for use and to receive the straw from the separator, parts of the separator being broken away to economize space.
Figure 2:
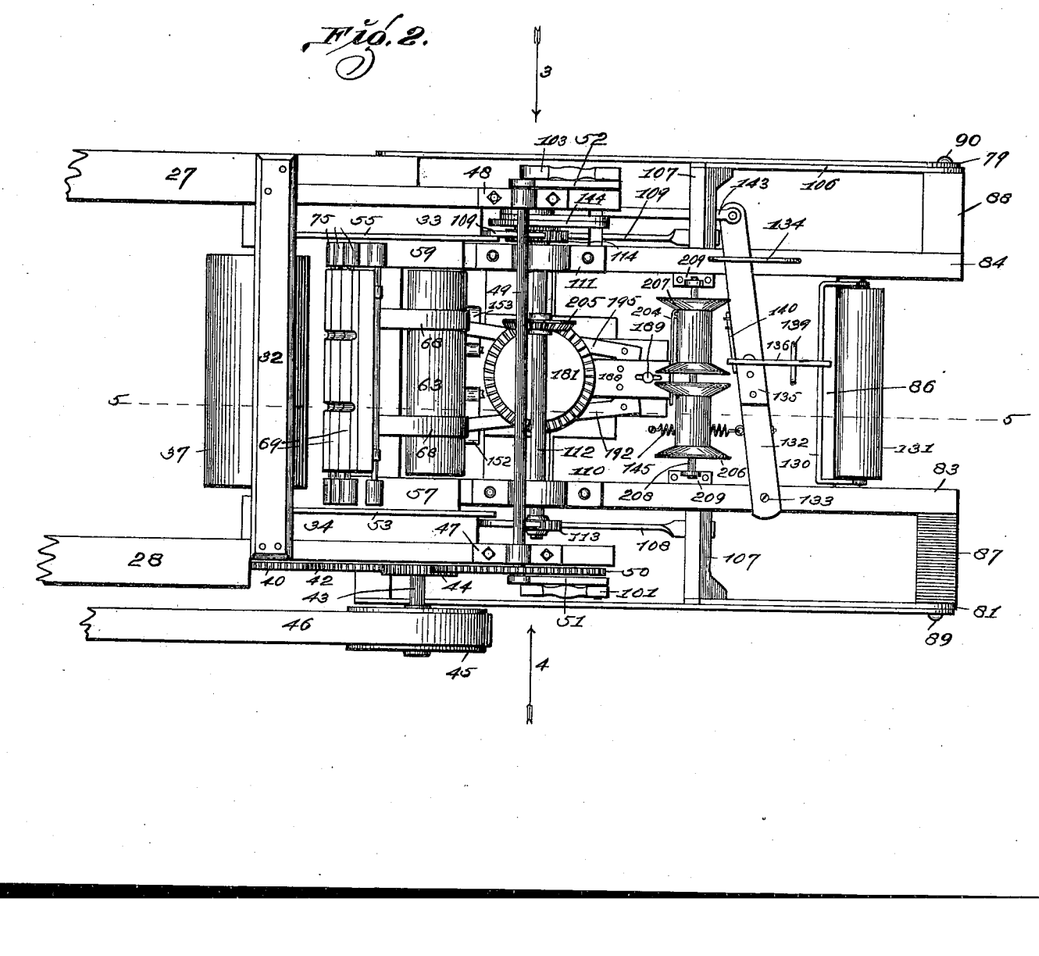
Fig. 2 is a bottom plan view of the baling-machine.

A lever 132 is pivotally connected to the lower edge of the side piece 83 by means of the pin 133, and said lever extends across the lower side of the baling-box and to a point outside of the side piece 84, as shown in Fig. 2. The staple 134 has its ends inserted into the lower edge of the side piece 84 and forms a slide through which the free end of the lever 132 operates. A block 135 is attached to the lever 132 near its center, and the catch 136 is pivotally attached to said block, said catch extending from said block toward the rear end of the baling-box. The tooth 137 projects from the extreme rear end of the catch 136 to engage the wire 130 and hold the gate closed. A tooth 138 has an inclined rear face which engages the staple 139, projecting downwardly from the bottom of the baling-box. A spring 140 is attached to the lower edge of the lever 132, with its free end in engagement with the forward end of the latch 136, the tension of said spring being exerted to bring the forward end of the latch downwardly and the rear end of the latch upwardly, as required to yieldingly hold the tooth 137 in engagement with the wire 130. When the bale presses against the gate, it will elevate the free end of the lever 132, and the inclined face of the tooth 138 engaging the staple 139 will swing the rear end of the latch downwardly and release the gate.

Figures 4, 12, 13, 14:
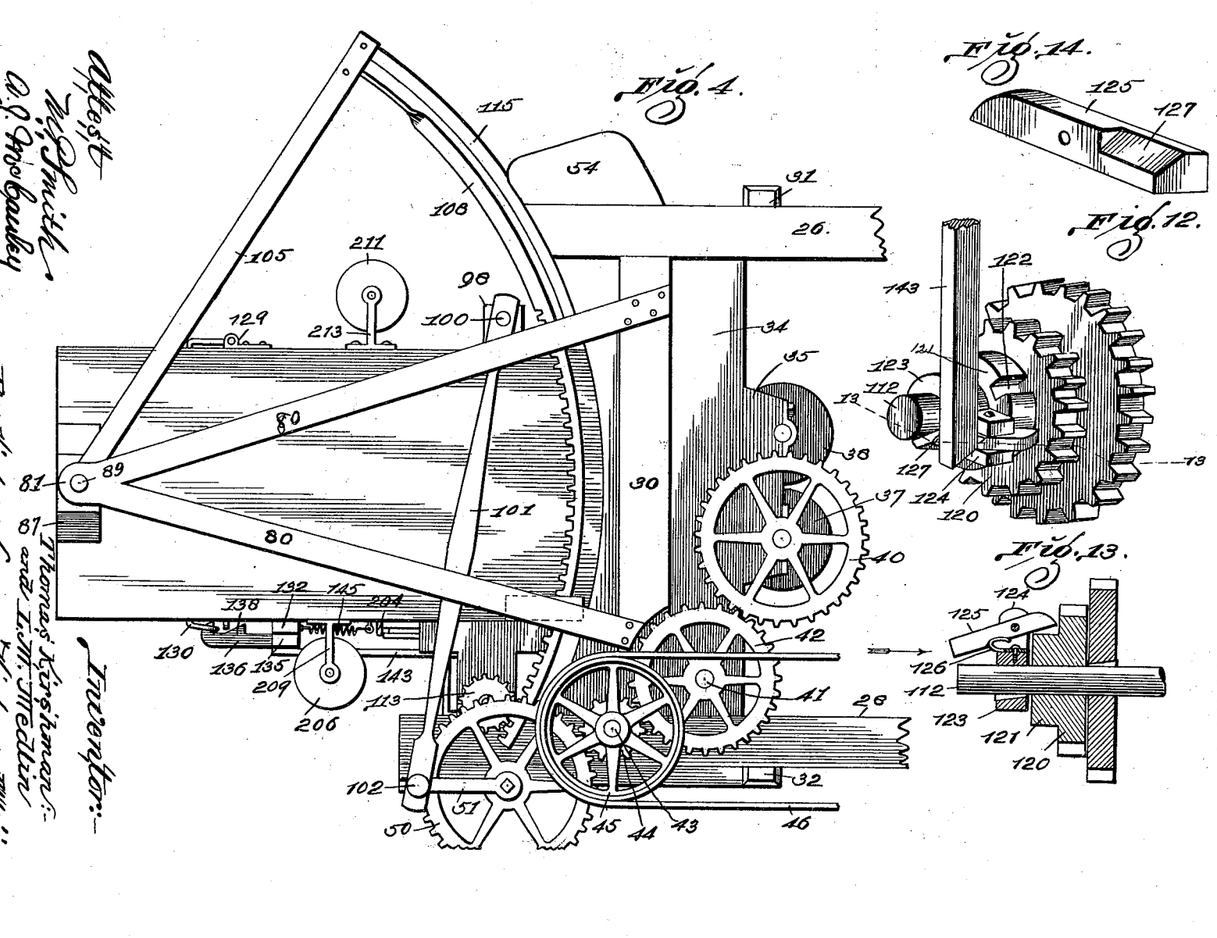
Fig. 4 is a side elevation taken looking in the direction indicated by the arrows 4 in Figs. 1 and 2.
Fig. 12 is a view in perspective of the clutch mechanism seen looking in the direction indicated by the arrow 12 in Fig. 3.
Fig. 13 is a section taken approximately on the line 13 13 of Fig. 12.
Fig. 14 is a view in perspective of the latch used in the clutch mechanism and indicated by the arrow 14 in Fig. 13.

The guide-arm 141 extends upwardly from the lower edge of the side piece 84 and has a slot 142 formed in its outer end in a line longitudinally of the side piece. The bar 143 is pivotally connected to the free end of the lever 132 and extends downwardly through the opening 142 in the arm 141, then downwardly at right angles to a point below the shaft 112, and then backwardly at right angles to a point behind said shaft 112, as indicated in dotted lines in Fig. 3. The lower end of the sliding bar 143 is normally in contact with the beveled face 127 of the latch 125, as shown in Fig. 12, and when so in contact holds the inner end of the latch out of engagement with the slot 122 in the wheel 121. A segmental rack 144 (see Figs. 2 and 9) is mounted beside the rack 109, said rack 144 being attached to the framework which supports the bearing 48 and said rack being in mesh with the gear 120. When the sliding bar 143 is in engagement with the latch 125 and holds said latch out of engagement with the slot 122, the gear 120 will rotate freely on the shaft 112 when the baling-box is reciprocated, and when the bale within the baling-box engages the gate and elevates the bar 143 out of engagement with the latch 125 said latch will engage in the slot 122 and cause the shaft 112 to rotate with the gear 120, and the needles are operated by the rotation of said shaft 112.

When the pressure of the bale within the box causes the gate to become disconnected from the latch 136, the retractile coil-spring 145, attached to the lever 132 and to the baling-box, will cause the sliding bar 143 to return to its normal position and contact with the beveled face 127 of the latch and will disengage the latch from the slot 122, and then the shaft 112 will cease to rotate.

Figures 15, 16, 17, 18, 19, 20, 21, 22:
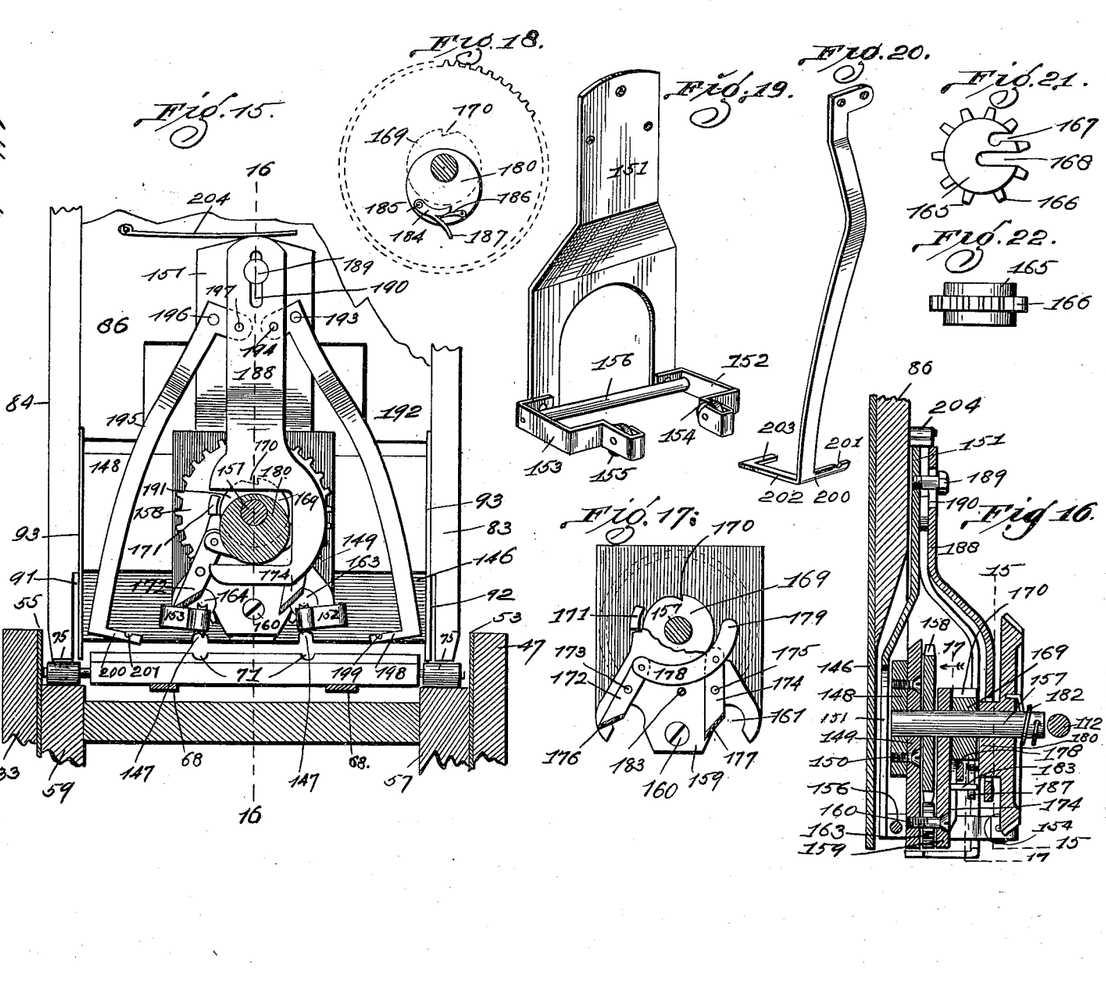
Fig. 15 is a horizontal section taken approximately on the lines 15 15 of Figs. 5 and 16.
Fig. 16 is a section taken approximately on the lines 16 16 of Fig. 15.
Fig. 17 is a section taken approximately on the line 17 17 of Fig. 16 and looking in the direction indicated by the arrow.
Fig. 18 is a section on the same line as Fig. 15 and looking in the opposite direction.
Fig. 19 is a view in perspective of one of the sliding plates shown in Figs. 15 and 16.
Fig. 20 is a view in perspective of one of the pivoted arms shown in Fig. 15.
Fig. 21 is a plan view of one of the knotter-wheels.
Fig. 22 is an edge view of the wheel shown in Fig. 21.

The knotter is attached to the lower face and rear end of the bottom piece 86 of the baling-box and is constructed as shown in detail in Figs. 15 to 22, inclusive. A portion of the bottom piece 86 is cut away at its rear end and a plate 146 is inserted in place of the cutaway portion, there being notches 147 in the front edge of said plate in alinement with the slots 117 and 118 and to allow the points of the needles to pass through the plate. The cross-piece 148 is mounted in position between the plates 93 below the plate 146, leaving a space between said plate 146 and said cross-piece 148. A rectangular plate 149 is secured in position against the lower face of said cross-piece 148 by means of the screws 150. The plate 151 is placed between the plate 146 and the cross-piece 148 and extends some distance backwardly below the bottom piece 86. The arms 152 and 153 are attached to the front end of the plate 151 and extend downwardly at right angles, and then inwardly, and then downwardly again, the grooved rollers 154 and 155 being mounted in the lower inner ends of said arms in alinement with the path of travel of the needles. A shaft 156 connects the front ends of the arms 152 and 153, said shaft operating above the front end of the plate 149. A shaft 157 is mounted in bearings through the cross-piece 148 and through the plate 149 and extends downwardly to a point near the shaft 112. A spur-gear 158 is fixed upon the shaft 157 immediately in front of the plate 149. The plate 159 is placed in position upon the shaft 157, in front of the gear 158, and said plate 159 is secured in position by means of the screw 160, which screw is inserted through the front end of said plate and screw-seated in the front end of the plate 149. The slotted bearings 161 and 162 are formed in the front edges of the plates 159 and 149 in alinement with the rollers 154 and 155, respectively, and the knotter-wheels 163 and 164 are mounted in said bearings. The knotter-wheels are constructed as shown in Figs. 21 and 22, and each consists of the cylindrical body 165, having the gear-teeth 166 projecting from the center of its periphery and having the slots 167 and 168 formed upon opposite sides of one of said teeth and extending toward the axial center of the cylindrical body. The knotter-wheels are placed in position with the teeth 166 between the plates 149 and 159 and with the ends of the cylindrical body operating in the bearings 161 and 162, respectively, and with the teeth 166 in mesh with the teeth of the spur-gear 158. The wheel 169 is fixed upon the shaft 157 immediately in front of the plate 159, and a notch 170 is formed in the periphery of said wheel. The plate 159 is triangular and only covers a small part of the lower face of the gear 158. A lug 171 projects downwardly from the lower face of the gear 158 past the periphery of the wheel 169 and engages the edge of the plate 159, as shown in Figs. 15 and 17. A bar 172 is pivotally attached in position against the lower face of the plate 159 by means of the pin 173, and a similar bar 174 is attached to said plate by means of the pin 175. Upon corresponding ends of said bars 172 and 174 are sheared edges 176 and 177, respectively, and the opposite ends of said bars are connected by means of the segmental connecting-rod 178, said connecting-rod being located immediately outside of the periphery of the wheel 169 and the end 179 of said connecting-rod being in the path of travel of the lug 171, as required to operate the shears when the gear 158 is rotated to bring the lug 171 into contact with the end 179 of said bar. The shear edges 176 and 177 are mounted to reciprocate against the lower ends of the cylindrical bodies 165 and in lines transversely of the slots 167 and 168. The wheel 180 is loosely mounted eccentrically upon the shaft 157 immediately in front of the wheel 169, and the beveled gear 181 is formed integral with the lower face of said eccentric, as required to bring the teeth of said gear concentric to the shaft 157. A coil-spring 182 has one of its ends fixed to the gear 181 and its opposite end fixed to the shaft 157, as required to form a yielding connection between said shaft and said gear. A pin 183 projects downwardly from the center of the plate 159, substantially half-way between the pins 173 and 175. A pawl 184 is pivotally connected to the upper face of the eccentric 180 by means of the pin 185 and in position to have its free end engage the slot 170, formed in the wheel 169. The spring 186 holds the free end of the pawl 184 yieldingly in engagement with the periphery of the wheel 169. An arm 187 projects outwardly from the pawl 184 in position to engage the pin 183 and as required to draw the free end of the pawl 184 out of the slot 170 when the arm 187 engages the pin 183.

The plate 188 is slidingly connected to the front end of the plate 151 at its front end by means of the pin 189 inserted through the slot 190 in said plate 188 and fixed in said plate 151. The plate 188 extends forwardly and outwardly and has a slot 191 formed transversely from one of its sides, in which the eccentric 180 operates. The arm 192 is pivotally attached to the plate 151 by means of the pin 193 and in turn is pivotally attached to the plate 188 by means of the pin 194. The arm 195 is attached to the plate 151 by means of the pin 196 and to the plate 188 by means of the pin 197. The arms 192 and 195 are substantially alike, except that they are constructed in rights and lefts, and said arms extend below the cross-piece 148 to the front edge of the plate 146. The finger 198 extends inwardly from the front end of the arm 192 and has the notch 199 in its upper face. The finger 200 extends forwardly from the lower end of the arm 195 and has a notch 201 in its upper face. A bar 202 extends forwardly from the front end of each of the arms 192 and 195 and a finger 203 extends inwardly from the upper end of each of said bars 202, said fingers 203 being parallel with the fingers 198 and 200, respectively. A leaf-spring 204 is attached to the lower face of the bottom piece 86, and its free end engages the rear ends of the plates 151 and 188, and its tension operates to slide said plates forwardly. A beveled gear 205 is fixed upon the shaft 112 and meshes with the beveled gear 181.

In the practical operation of our baling-machine the straw is delivered by the apron 39 to the feed-rollers 37 and 38 and passes between said feed-rollers and is crushed into a web and by the feed-rollers is passed between the reciprocating aprons into the baling-box, where it is folded back and forth upon itself and packed by the operation of the slats 69 and 70 of the reciprocating aprons, which operate in conjunction with the oscillating baling-box. The baling-box is reciprocated by the operation of the shaft 49, driving the crank-arms 51 and 52 and the connecting-rods 101 and 103. When the baling-box is filled, the pressure of the bale upon the gate will operate the sliding bar 143 and release the latch to engage in the slot 122, thus operating the shaft 112, as before suggested. The operation of the shaft 112 operates the racks 108 and 109 and draws the needles through the baling-box, and the operation of said shaft also operates the knotter mechanism. The gear 120 is of such a size that it will make slightly less than one revolution backwardly and forwardly as the baling-box is reciprocated. When the needles are passing through the baling-box, the knotter mechanism is at a standstill, because the pawl 184 is upon the opposite side of the shaft from the notch 120 when the knotter mechanism is at rest and while the bale is being formed, as shown in Fig. 18, and the pawl 184 moves backwardly from its normal position until it engages the slot 170 during the passage of the needles forwardly through the baling-box. One half of the wires to be used in binding the bale are mounted upon the spools 206 and 207, which spools are mounted upon the spindle 208, and said spindle is supported by the brackets 209, attached to the lower face of the bottom piece 86, and said wires lead from said spools around the grooved rollers 154 and 155, respectively. The other half of the wires are mounted upon the spools 210 and 211, which spools are supported by means of the spindle 212, mounted in bearings in the brackets 213, attached to the upper face of the top piece 85, and said wires lead from said spools around the grooved wheels 119, carried by the needles, and then across the front end of the baling-box and are attached to the ends of the first-mentioned wires. As the web of straw presses into the baling-box it is pressed against the wires and the wires are drawn around the bale—that is to say, they extend across the rear end of the bale and along the top and bottom sides of the bale. When the baling-box oscillates upwardly, the slats 70 move in the same direction with said box, and when said box is at its upward limit of movement the row of slats entirely closes the open end of said box. When said box moves to its downward limit of movement, the slats 69 entirely close the open end. Consequently when a web of straw or like material is passing between the rollers 37 and 38 and into the baling-box said web will be pressed against the baling-wires which extend across said box and, owing to the oscillation of the box and the reciprocation of the aprons, will be folded backward and forward upon itself. When the bale has reached the desired size and has operated the gate to release the clutch mechanism and operated the needles, the wires are carried across the front end of the bale by the operation of the needles.

When the needles have passed through the baling-box, the eccentric 180 presses the plate 188 rearwardly, thus swinging the forward ends of the arms 192 and 195 toward each other and bringing the fingers carried by said arms into position in front of the wire. The continued operation of the eccentric slides the plate 151 rearwardly, and this operation carries the grooved wheels 154 and 155, together with the fingers carried by the arms 192 and 195, rearwardly, thus pressing the wires into the slots 167 and 168 of the knotter-wheel. At the time the wires have been placed in their proper positions in the slots 167 and 168 the end of the pawl 184 is ready to engage in the slot 171, and the continued operation of the machine reverses the motion of the eccentric, rotates the gear 158, thus rotating the knotter-wheels and twisting the wires, and after the wires have been twisted together the continued operation of the machine brings the lug 171 into engagement with the end 179 of the connecting-rod 178 and operates the shears and cuts the wires. The wires are twisted together at each of the ends of the cylindrical bodies 165 of the knotter-wheels, and when they are cut each pair of wires is separated at a point between two points, where they are twisted together. The needles then return to their normal positions, thus stretching the wires across the front end of the baling-box to receive another bale, and the continued operation of the knotter mechanism brings the arm 187 into contact with the pin 183, thus pulling the pawl 184 out of the notch 170, and the tension of the spring 182 operates to rotate the shaft 157 and to turn the gear 158 to its normal position.

It is obvious that the baling-machine may be used independently or in connection with other machines, as well as in connection with a separator, and that it may be used in baling hay or any material which may be baled.

We claim—

1. In a baling-machine, a baling-box, feed-rollers mounted to feed a web of material into said box, means for packing said web into said box, means carried by and swinging from the rear end of the box for locating binding-wires across the mouth of said box in front of the web of material and for passing the wires across the mouth of the box after the same has been filled with the material, and means for throwing into operation the wire-binding mechanism, which last-mentioned means is located on top of and across the discharge end of the baling-box and which is operated by the pressure of the completed bale, substantially as specified.

2. In a baling-machine, a baling-box open at both ends, pivotally mounted at its rear end, means for oscillating said box, reciprocating aprons mounted in front of said baling-box and connected to said baling-box whereby they are reciprocated by the oscillation of the baling-box, feed-rollers mounted in front of said reciprocating aprons, a gate mounted at the rear end of said baling-box to be opened by the pressure of the bale, mechanism for binding the bale and connections between said binding mechanism and said gate whereby the binding mechanism is released to operate by opening the gate, substantially as specified.

3. In a baling-machine, a suitable frame, a pair of feed-rollers mounted in said frame, a reciprocating apron behind each of said feed-rollers, a baling-box mounted behind said apron, said baling-box being pivotally mounted at its end opposite said aprons, connections between the oscillating end of said baling-box whereby the aprons are operated by the operation of the baling-box, and connections between said feed-rollers and said baling-box whereby the baling-box is oscillated simultaneously with the operation of the feed-rollers, substantially as specified.

4. In a baling-machine, a suitable frame, a baling-box mounted in said frame, the rear end of said box being pivotally connected to the frame, arms extending from the pivots of said baling-box, segmental racks attached to the free ends of said arms and extending from said arms upon opposite sides of the baling-box, needles attached to said arms and extending through the forward end of the baling-box, means of operating said racks as required to draw the needles through the baling-box, and means of discharging material into said baling-box in the form of a web and folding said web back and forth upon itself and packing said web into said baling-box, substantially as specified.

5. In a baling-machine, a baling-box pivotally mounted at its rear end, means for feeding a web of material into said box, wire-carrying needles mounted to pass the forward end of said baling-box, means of operating said needles and means of tying the wire after it has been passed around the bale by the operation of the needles, substantially as specified.

6. In a baling-machine, a baling-box pivotally mounted at its rear end, means for feeding a web of material into said box, needles mounted to pass the forward end of said baling-box, means of operating said needles, mechanism carried by said baling-box for tying the wire after it has been passed around the bale by said needles, and mechanism for throwing the needle-operating mechanism and knotter mechanism into and out of gear by the pressure of the bale, substantially as specified.

7. In a baling-machine, a baling-box pivotally mounted at its rear end, means for conveying straw into said baling-box and in the form of a web and folding the web back and forth upon itself, needles mounted to pass the forward end of said baling-box and means of operating said needles whereby wire is passed around the bale, means of tying the wire after it has been passed around the bale by the operation of the needles, means of cutting the wire after it has been tied, and means of throwing the needle-operating and wire-tying mechanism into and out of gear by the pressure of the bale, substantially as specified.

In testimony whereof we affix our signatures in presence of two witnesses.

THOMAS KIRSHMAN.
LOGAN M. MEDLIN.

Witnesses:
H. E. BLAKEMAN,
ED. PHILLIPS.